Oct. 27, 1931.   J. L. DRAKE   1,828,834
PROCESS OF PRODUCING SHEET GLASS
Filed July 27, 1928   3 Sheets-Sheet 1
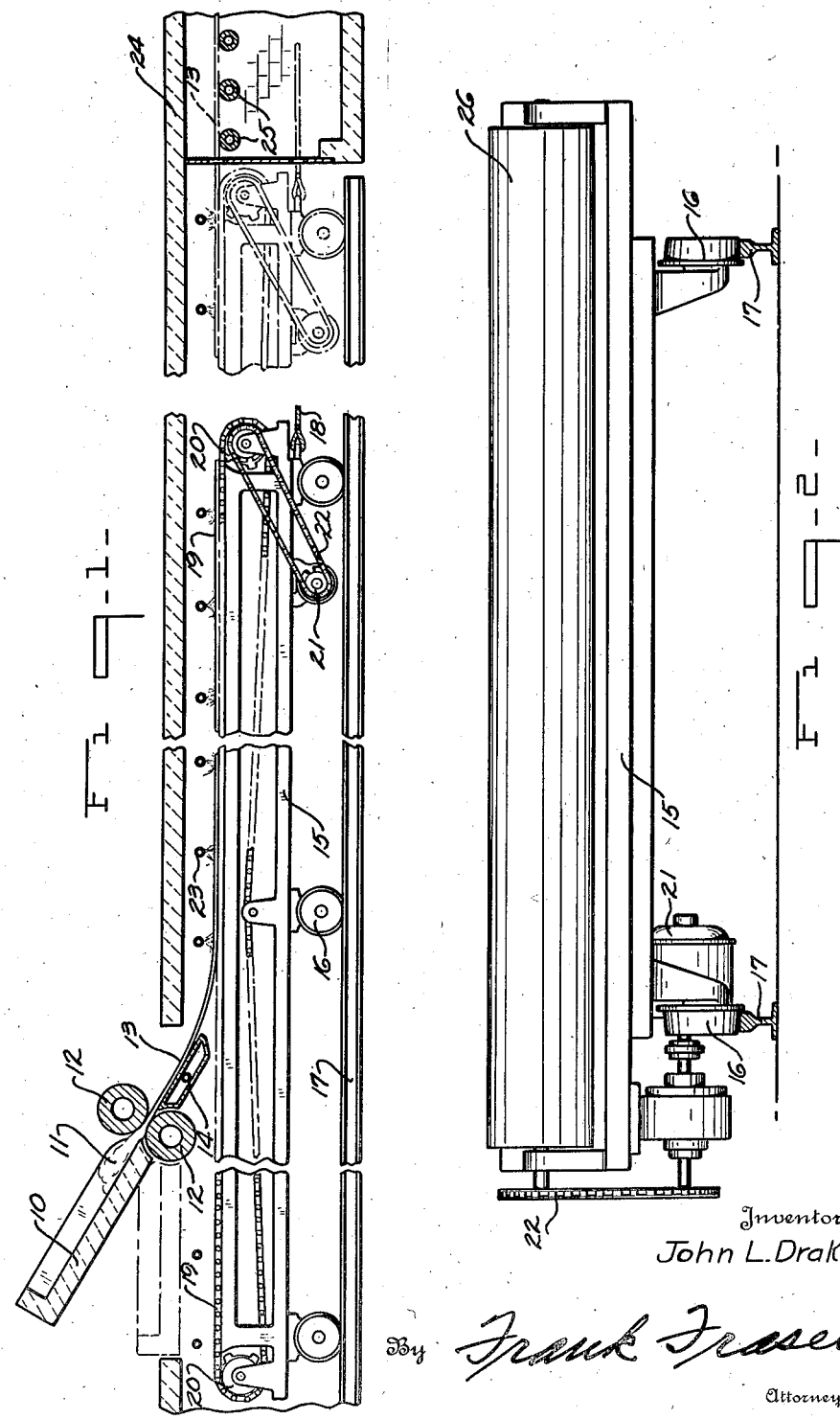
Inventor
John L. Drake
By Frank Fraser
Attorney Oct. 27, 1931.  J. L. DRAKE  1,828,834
PROCESS OF PRODUCING SHEET GLASS
Filed July 27, 1928  3 Sheets-Sheet 2
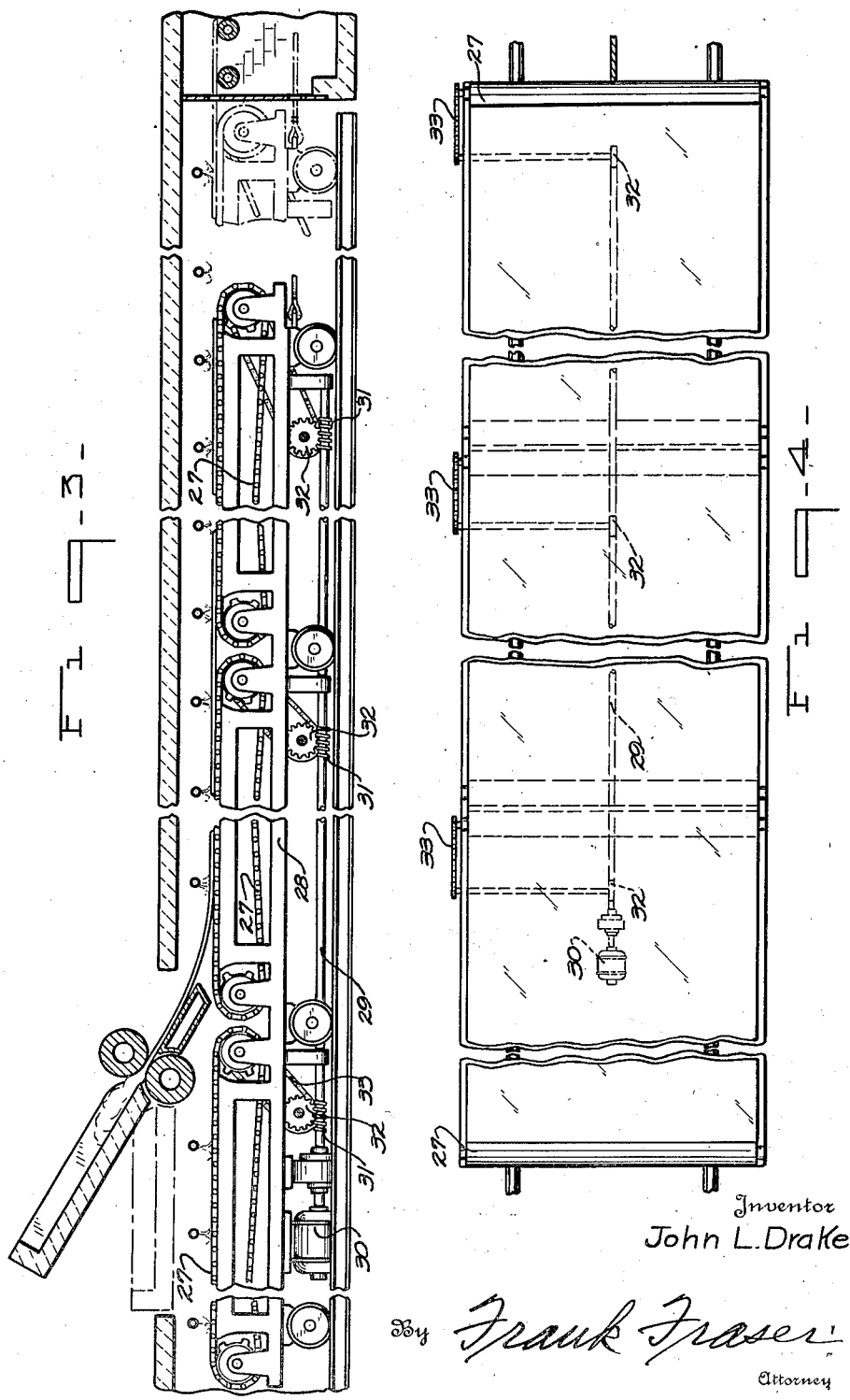
Inventor
John L. Drake
By Frank Fraser
Attorney Oct. 27, 1931. J. L. DRAKE 1,828,834
PROCESS OF PRODUCING SHEET GLASS
Filed July 27, 1928 3 Sheets-Sheet 3
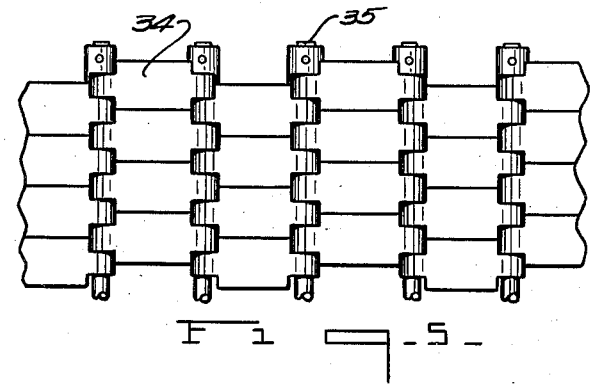
Fig-5-
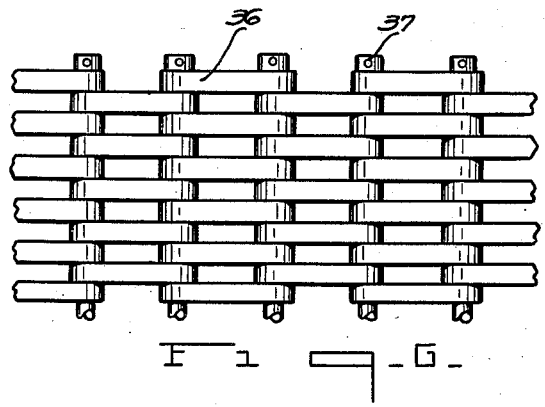
Fig-6-
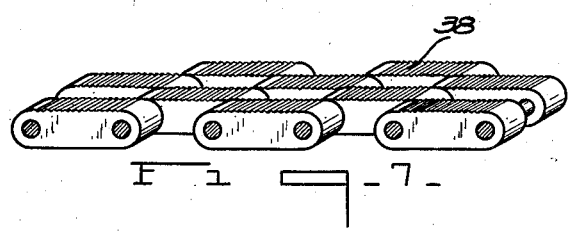
Fig-7-
Inventor
John L. Drake
By Frank Fraser
Attorney Patented Oct. 27, 1931

1,828,834

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS OF PRODUCING SHEET GLASS

Application filed July 27, 1928. Serial No. 295,630.

The present invention relates to an improved process of and an apparatus for producing sheet glass.

An important object of this invention is to facilitate, expedite and improve generally the production of sheet glass by an intermittent process.

Another object of the invention is to provide such a process and apparatus whereby a mass of molten glass is rapidly reduced to sheet form, the sheet being carried forwardly at a rate of speed equal to the forming speed thereof, the forward speed of the sheet being subsequently reduced as it is passed into and through an annealing zone.

Another object of the invention is the provision of means for receiving thereupon a newly formed sheet of glass, the said means being movable as a unit during the laying of the glass sheet thereon after which a portion of said means only is moved to effect the discharging of the sheet therefrom into an annealing leer.

A further object of the invention is the provision of apparatus including means for reducing a mass of molten glass to sheet form, the newly formed sheet being deposited upon a movable conveyor carried by a truck or the like, the truck and conveyor being moved forwardly as a unit during the laying of the sheet thereon at the same speed as that at which said sheet is formed after which said truck is stopped and the conveyor actuated to transfer the sheet therefrom into an annealing leer preferably at a speed different from the forming speed of the sheet.

Still another object is to provide such an apparatus for producing sheet glass including a truck or the like having one or more movable conveyors associated therewith, the conveyor or conveyors being normally stationary and adapted to receive a newly formed sheet of glass thereon, the truck being movable from a position in proximity to the sheet forming mechanism to a position adjacent the intake end of an annealing leer at which point the movement of the truck is stopped and the conveyor or conveyors carried by the truck operated to transfer the sheet therefrom into the annealing leer.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through one form of apparatus constructed in accordance with the present invention.

Fig. 2 is an end elevation of a portion thereof.

Fig. 3 is a vertical longitudinal section showing a modified construction.

Fig. 4 is a plan view thereof, and

Figs. 5, 6 and 7 are fragmentary views showing different types of conveyors that may be used.

Referring to the drawings, the numeral 10 designates a table or support adapted to receive thereupon a charge or mass of molten glass 11. Because of the fine quality of pot glass, its use is herein preferred and when such glass is utilized, it is desired that the size of the table 10 be such that an entire potful of glass may be supported at one time thereon. When the supply of glass 11 is deposited upon the table, the said table is adapted to be disposed in a substantially horizontal position as indicated by the broken lines in Fig. 1. Mounted in proximity to the table 10 is a pair of forming rolls 12 spaced from one another to create a sheet forming pass therebetween and through which the molten glass 11 is adapted to be moved and reduced to a sheet 13 of substantially predetermined and uniform thickness. During the feeding of the glass between the rolls 12, the table 10 is raised to the tilted position indicated by the full lines. The sheet thus formed is caused to move downwardly over an inclined slab 14 mounted beneath the sheet forming pass. It will of course be understood that this invention is not limited to any particular type of sheet forming mechanism per se, but the invention is primarily designed for use in connection with an intermittent process where relatively small masses of glass are reduced to sheet form.

The numeral 15 designates a relatively long truck or carriage mounted upon wheels 16 which run upon tracks 17, said truck being adapted to be moved in a definite substantially horizontal path beneath the lower end of the slab 14. This movement of the truck may be effected by any suitable drive mechanism but for the purposes of illustration, there has been shown diagrammatically a cable 18 secured to the forward end thereof.

Associated with the truck 15 is a conveyor 19 preferably of endless belt formation and composed of a plurality of pivotally associated links. The endless conveyor 19 is trained about sprockets or drums 20 carried at the opposite ends of the truck 15 and either one or both of these sprockets or drums may be positively driven as desired. Carried by the truck is a motor 21 which drives a sprocket chain 22 to effect rotation of the conveyor 19. The upper horizontal run of the conveyor 19 is adapted to be dragged over the upper surface of the truck 15 and for this reason, it is desirable that the upper surface of said truck be substantially flat to present a master surface to the said conveyor.

At the beginning of the sheet forming period, the truck is adapted to be moved to the left so that the right hand end of the conveyor will be arranged or positioned substantially beneath the lower end of the slab 14. The mass of glass 11 is then deposited upon the table 10 and the said table tilted to cause the glass to flow downwardly between the forming rolls 12. As the sheet 13 is formed, it passes downwardly over the slab 14 and simultaneously the truck is moved to the right so that the sheet will be laid upon the upper horizontal run of the conveyor 19. During this portion of the operation, the truck and conveyor are moved forwardly as a unit with the conveyor remaining stationary. That is, during the laying of the glass sheet upon the conveyor, the said conveyor does not rotate. The forward movement of the truck is substantially identical with the speed at which the sheet is being formed so that as the sheet is laid upon the conveyor, it will not be buckled, distorted or otherwise disturbed. To prevent undue chilling of the sheet upon the conveyor, temperature control means in the form of burners or the like 23 may be provided.

The length of the truck 15 and conveyor 19 is preferably such that the entire mass of molten glass 11 can be reduced to sheet form and the entire sheet thus formed supported upon said conveyor. The truck and conveyor are adapted to be moved forwardly into a position adjacent the intake end of the annealing leer 24, which position is illustrated in broken lines to the right of Fig. 1. When the truck is brought into this position, the said truck is stopped and the motor 21 placed in operation in a manner to drive or move the conveyor 19, said conveyor being rotated in a clockwise direction to feed or effect the transfer of the sheet 13 into the annealing leer 24, wherein it may be supported and carried along upon a series of conveyor rolls 25. The speed at which the sheet is fed into the annealing leer is preferably less than the speed at which the said sheet is formed. By the time the sheet leaves the conveyor 19 it has become sufficiently set to sustain its own weight without sagging between the conveyor rolls 25 in leer 24. While a plurality of rolls have been shown for supporting the sheet within the leer, it will be readily perceived that an endless belt conveyor may be arranged within the intake end of the leer if desired. Attention is directed to the fact that the drive for the truck is adapted to be independent of the drive for the endless conveyor and vice versa.

In Fig. 2 is illustrated an end view of a slightly modified form of conveyor wherein a preferably metallic band or belt 26 is utilized in lieu of the link construction shown in Fig. 1. Although a metallic belt is preferred, an asbestos conveyor or one of equivalent material may be used.

In Figs. 3 and 4 is illustrated a somewhat modified construction which, it will be perceived, comprises a plurality of relatively short conveyors 27 arranged end to end and carried by a main truck 28. While the several conveyors 27 are shown as being carried by a single truck 28, a plurality of individual trucks may be provided, each carrying one of the conveyors and in the event such a construction is used, the trucks could be coupled together to form, in effect, a single conveyor mechanism. With the construction illustrated, a main drive shaft 29 is connected to and driven from a motor 30, said shaft and motor being hung from the truck 28 by a plurality of depending brackets. The shaft 29 carries a plurality of worms 31, each meshing with a gear 32 which in turn carries a sprocket driving a chain 33 which transmits power to the respective individual conveyors 27. In this, or any analogous manner, the drive for the individual conveyors may be synchronized.

In the operation of this form of the invention, the truck 28 and conveyors 27 are moved to the right beneath the sheet forming mechanism simultaneous with the forming of the sheet so that the sheet, as it is formed, may be laid upon the said conveyors. During the laying of the sheet upon the conveyor belts, the said belts remain stationary or, in other words, are not moved except in so far as they are carried along by the truck 28. After the sheet has been laid upon the conveyors, the truck is moved to a position adjacent the intake end of the annealing leer and the truck stopped after which the conveyors are rotated at a speed relatively slower than the forming speed of the sheet to transfer the said sheet into the leer. The speed of the sheet through the leer either in this case or in the case of Fig. 1 can be controlled as desired.

The word "stationary" as applied to the conveyor 19 or conveyors 27 in the claims is to be interpreted as meaning that the said conveyor or conveyors is or are not being rotated or moved except in so far as they are carried along by their respective trucks.

In Figs. 5, 6 and 7 are illustrated different forms of conveyors which may be utilized. In Fig. 5, the conveyor consists of a plurality of links 34 pivotally connected by means of transverse rods 35. The links 34 are so shaped that the conveyor will present a substantially flat and unbroken surface when disposed in its upper horizontal or sheet supporting run. Fig. 6 discloses a modified construction which likewise comprises a plurality of links 36 pivotally associated by rods 37. The sheet contacting surfaces of the links shown in Fig. 7 are serrated as at 38 and the links 34 in Fig. 5 may also be serrated if desired. These serrations are provided to form ridges in the glass sheet 13, which ridges can be readily removed during the grinding of the glass when it is being formed into plate glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing sheet glass, consisting in first forming the sheet at a relatively rapid rate of speed, laying the sheet as it is formed upon a table carried at the same speed in a definite substantially horizontal path, and in then moving said table at a relatively slower speed to feed the sheet into an annealing chamber.

2. The process of producing sheet glass, consisting in first forming the sheet at a relatively rapid rate of speed, laying the sheet as it is formed upon a table having a translatory motion and traveling at a speed equal to the speed of formation of the sheet, and in then imparting a circulatory motion to said table at a relatively slower speed to feed the sheet into an annealing chamber.

3. The process of producing sheet glass, consisting in first forming the sheet, laying the sheet as it is formed upon a table having a translatory motion, moving the table to a point adjacent an annealing chamber, stopping the translatory motion of the table at such point, and in then imparting a circulatory motion to said table to effect the delivery of the sheet therefrom into said annealing chamber.

4. The process of producing sheet glass, consisting in first forming the sheet at a relatively rapid rate of speed, laying the sheet as it is formed upon a table having a translatory motion and traveling at a speed equal to the speed of formation of the sheet, moving the table to a point adjacent an annealing chamber, stopping the translatory motion of the table at such point, and in then imparting a circulatory motion to the table at a relatively slower speed to feed the sheet therefrom into said annealing chamber.

5. The process of producing sheet glass, consisting in first forming the sheet, laying the sheet as it is formed upon a supporting surface capable of two independent movements, in imparting one of said movements to the surface during the laying of the sheet thereupon, and in then imparting a second independent movement to said surface to effect delivery of the sheet therefrom into an annealing chamber while at the same time discontinuing the first movement.

6. The process of producing sheet glass, consisting in forming the sheet at a relatively high rate of speed, laying the sheet as it is formed upon a supporting surface capable of two independent movements, in imparting one of said movements to the surface during the laying of the sheet thereupon, and in then imparting a second independent movement to said surface to effect delivery of the sheet therefrom into an annealing chamber while at the same time discontinuing the first movement, the first movement imparted to said surface having a speed substantially equal to the speed of formation of the sheet while the speed of the second movement imparted to the surface is relatively slower.

7. The process of producing sheet glass, consisting in first forming the sheet, laying the sheet as it is formed upon a supporting surface, advancing said surface bodily forwardly to receive the sheet thereupon, in stopping the forward bodily movement of said surface, and in imparting a second movement to said supporting surface independently of its forward bodily movement to effect transfer of the sheet therefrom into an annealing chamber.

8. The process of producing sheet glass, consisting in forming the sheet at a relatively high rate of speed, laying the sheet as it is formed upon a supporting surface, advancing said surface bodily forwardly at a speed substantially equal to the speed of formation of the sheet to receive the said sheet thereupon, in stopping the forward bodily movement of said surface, and in imparting a second movement to said surface independently of its forward bodily movement to deliver the sheet therefrom into an annealing chamber at a speed relatively less than its speed of formation.

9. The process of producing sheet glass, consisting in first forming the sheet, laying the sheet as it is formed upon a conveying means, carrying said conveying means bodily forwardly to receive the sheet thereupon, in stopping the forward bodily movement of said conveying means, and in then driving said conveying means independently of its forward bodily movement to deliver the sheet therefrom.

10. The process of producing sheet glass, consisting in forming the sheet at a relatively high rate of speed, laying the sheet as it is formed upon a conveying means, carrying said conveying means bodily forwardly at a speed substantially equal to the speed of formation of the sheet to receive the same thereupon, in stopping the forward bodily movement of said conveying means, and in then driving said conveying means independently of its forward bodily movement to deliver the sheet therefrom into an annealing chamber at a speed relatively less than its speed of formation.

Signed at Toledo, in the county of Lucas and State of Ohio, this 25th day of June, 1928.

JOHN L. DRAKE.